United States Patent
Kärki et al.

(12)

(10) Patent No.: US 6,924,371 B2
(45) Date of Patent: *Aug. 2, 2005

(54) USE OF A WEAKLY ACID CATION EXCHANGE RESIN FOR CHROMATOGRAPHIC SEPARATION OF CARBOHYDRATES

(75) Inventors: Ari Kärki, Lohja (FI); Heikki Heikkilä, Espoo (FI); Juho Jumppanen, Surrey (GB); Jari Tiihonen, Lappeenranta (FI); Tiina Tervala, Kirkkonummi (FI); Nina Mäyrä, Helsinki (FI); Vili Ravanko, Clinton, IA (US); Hannu Paananen, Kantvik (FI); Erkki Paatero, Kauniainen (FI)

(73) Assignee: Danisco Sweeteners Oy, Espoo (FI)

( * ) Notice: Subject to any disclaimer, the term of this patent is extended or adjusted under 35 U.S.C. 154(b) by 50 days.

This patent is subject to a terminal disclaimer.

(21) Appl. No.: 10/403,089

(22) Filed: Mar. 31, 2003

(65) Prior Publication Data

US 2004/0006223 A1 Jan. 8, 2004

Related U.S. Application Data

(63) Continuation of application No. PCT/FI01/00846, filed on Sep. 28, 2001.

(30) Foreign Application Priority Data

Sep. 29, 2000 (FI) .............................................. 20002149

(51) Int. Cl.$^7$ ................................................. C07H 3/00
(52) U.S. Cl. ..................................... 536/124; 536/127
(58) Field of Search ................................ 536/124, 127

(56) References Cited

U.S. PATENT DOCUMENTS

| | | |
|---|---|---|
| 4,664,718 A | 5/1987 | Chang |
| 4,772,334 A | 9/1988 | Hatanaka et al. |

FOREIGN PATENT DOCUMENTS

| | | | |
|---|---|---|---|
| EP | 1 076 100 A1 | 2/2001 | |
| FI | 102962 B | 3/1999 | |
| FI | 20002149 | 10/2001 | |
| JP | 09-127090 | * 5/1997 | .......... G01N/30/88 |

* cited by examiner

*Primary Examiner*—James O. Wilson
*Assistant Examiner*—Ganapathy Krishnan
(74) *Attorney, Agent, or Firm*—Scully, Scott, Murphy & Presser

(57) ABSTRACT

The invention relates to the use of a weakly acid cation exchange resin for chromatographic separation of carbohydrates. In the invention the hydrophilic/hydrophobic interaction of carbohydrates, sugars and sugar alcohols with the weakly acid cation exchange resin is utilized. The weakly acid cation exchange resin is used for separation of hydrophobic saccharides, such as deoxy, methyl and anhydrosugars and anhydrosugaralcohols from more hydrophilic saccharides.

43 Claims, 7 Drawing Sheets

USE OF A WEAKLY ACID CATION EXCHANGE RESIN FOR CHROMATOGRAPHIC SEPARATION OF CARBOHYDRATES

CROSS-REFERENCE TO RELATED APPLICATION

The present application is a continuation of PCT/FI01/00846, filed Sep. 28, 2001.

FIELD OF THE INVENTION

The present invention relates to the use of a weakly acid cation exchange resin for chromatographic separation of carbohydrates. Particularly the present invention relates to utilisation of hydrophilic/hydrophobic interaction of carbohydrates, sugars and sugar alcohols with the weakly acid cation exchange resin. More particularly, the invention relates to the use of a weakly acid cation exchange resin for separation of hydrophobic saccharides, such as deoxy, methyl and anhydrosugars and anhydrosugar alcohols from more hydrophilic saccharides.

BACKGROUND OF THE INVENTION

U.S. Pat. No. 2,684,331 discloses a method for chromatographic separation from one another two or more substances having widely different ionization constants and at least one of the substances undergoes conciderable ionization in a dilute aqueous solution thereof. However, the method has not been used for separating carbohydrates. The examples of the U.S. Pat. No. 2,684,331 describe separation of salts from organic solvents, e.g. sodium chloride from formaldehyde. The method comprises an ion exchange resin having an ion identical with an ion of highly ionized solute. The ion exchange resin is either a cation exchange resin or an anion exchange resin. The cation exchange resin contains sulphonate groups as functional groups. The anion exchange resin contains quaternary ammonium groups as functional groups.

U.S. Pat. No. 2,911,362 describes a method comprising a chromatographic separation process employing ion exchange resins for separating two or more water soluble organic compounds from one another in an aqueous medium in the absence of an ion exchange reaction, i.e. in the substantial absence of a chemical reaction involving an absorption of ions from the aqueous medium by the resin or the introduction of ions into the solution from the resin. According to said method the ion exchange resin can be either a cation exchange resin or an anion exchange resin. The cation exchange resin may contain either sulfonate groups as functional groups or carboxylic acid groups as functional groups. The anion exchange resin contains quaternary ammonium groups as the functional groups therein. However, the separation has not been used for separation of carbohydrates.

Chromatographic separation has been used for recovery of xylose from hydrolysates of natural materials such as birch wood, corn cobs and cotton seed hulls in a method described in U.S. Pat. No. 4,075,406. The resin employed in the chromatographic separation is a strongly acid cation exchanger, i.e. sulfonated polystyrene cross-linked with divinyl benzene. The use of a strongly acid cation exchanger for separation of monosaccharides e.g. xylose from magnesium sulfite cook liquor is also known from the publication WO 97/49658. The chromatographic separation has been carried out using a simulated moving bed. However, the separation of certain monosaccharides by using strong acid cation exchange resins has turned out to be difficult. According to Samuelson (Samuelson, O., Chromatography on ion-exchange resins, J. Methods Carbohyd. Chem. 6 (1972) 65–75), for instance, the separation of rhamnose from other carbohydrates with strong cation exchange resins has been possible by using solvents e.g. alcohol as an eluent. Rhamnose is eluted before most other carbohydrates because it has a shorter retention time than aldoses and ketoses when aqueous ethanol is used as eluent. Water would be a preferred eluent, but when it is used the problem is that the various carbohydrates, such as rhamnose, arabinose and/or xylose have the tendency to elute at almost similar retention time whereby the fractions will overlap. The separation has not been proposed to be done by water eluent.

The separation of carbohydrates, especially xylose by strong acid cation exchangers has been practised industrially but is complicated and succeeded only in one way. The method presented in U.S. Pat. No. 5,998,607 has been used especially for separating xylose from the magnesium spent liquor. The problem has been the unsufficient separation of xylose and xylonic acid. The use of a weakly acid cation exchange resin did not give any benefit when solving the problem. In the method the separation requires two steps. In the first step the cation exchanger resin is used preferably in alkaline earth form, more preferably in $Mg^{2+}$ form and in the second step cation exchange resin is preferably in alkalimetal form (e.g. sodium). However, the separation of monosaccharides has also been found to be unsatisfactory since all the other monosaccharides elute at almost same retention time with xylose. The pH in the process was low. The resin in a divalent form seemed to separate the xylose more effectively than the resin in a monovalent form.

Publication PCT/FI00/00350 discloses sulphonated polymer resins, especially ion-exchange resins and the preparation of such resins. The polymer is a styrenedivinylbenzene copolymer, strongly acid cation exchange resin. The cross-linking agent can also be isoprene, allyl methylacrylate, vinyl methacrylate, glycol methacrylate or glycol diacrylate. According to the publication PCT/FI00/00350 the sulphonated polymer resin can be used as a chromatographic resin, ion exchange resin or as a catalyst resin.

U.S. Pat. No. 4,359,430 describes a process for recovering betaine from natural sources such as beet molasses, residue molasses and vinasses. The process uses a chromatographic column of strong acid cation exchange resin in alkali metal form, sodium being generally the preferred alkali metal. Water is used as eluent in the process. The process results in three fractions. The first fraction is a non sugar waste fraction, the second is a sugar containing fraction and the third fraction consists substantially of betaine.

Publication WO 96/10650 discloses a method for processing a beet derived sucrose containing solution to yield a sucrose enriched fraction and a fraction enriched with a second organic compound, especially such as betaine, inositol, raffinose, galactinol or serine and other amino acids. A strong acid cation exchanger preferably in sodium or potassium form is used for the separation of the fractions. From Finnish Patent No. 960 225 it is also known a method for fractioning of molasses by using a strong acid cation exchanger.

Anion exchange resins have been used for separating fructose from glucose. Y. Takasaki (Agr. Biol. Chem. 36 (1972) pages 2575–77) and B. Lindberg et al. (Carbohyd. Res. 5 (1967), pages 286–291) describe the use of an anion exchanger in bisulfite form for the separation of sugars. Water is used as eluent. However, the use of anion exchange resins does not result in a good xylose separation because the xylose is overlapping by other sugars. The separation of rhamnose has not been suggested. The separation of fructose and glucose by an anion exchanger in a bisulfite or sulfite form is known also from Patent FR-2 117 558.

U.S. Pat. No. 5,084,104 discloses a method for separation of xylose from pentose-rich solution, e.g. from birch wood. A chromatographic column which comprises a strong base anion exchange resin is used. The anion exchange resin is in sulfate form. Using this method xylose is retarded most strongly, but the other monosaccharides are eluted faster.

A method for preparing of L-arabinose is known from the publication WO 99/57326 where the process is charachterized by contacting plant fibers with an acid to hydrolyze the fibers under such conditions that the L-arabinose ingredients contained in the plant fibers are selectively obtained. U.S. Pat. No. 4,880,919 discloses a process for separating arabinose from mixtures of monosaccharides containing arabinose and other aldopentoses and aldohexoses by adsorption on sulfonated polystyrene divinyl benzene cross-linked ion exchange resins in with $Ca^{2+}$ and $NH_4^+$ forms and desorpting the adsorbate with water. A process for production of crystalline L-arabinose is known from U.S. Pat. No. 4,816, 078.

The preparation of arabinose is also known from the U.S. Pat. No. 4,664,718. In the method the arabinose is separated from the monosaccharide mixture containing also other aldopentoses and aldohexoses. The feed is contacted with calcium-Y-type or calcium-X-type zeolite and arabinose is adsorbed selectively. The desorption is conducted with water or ethanol.

Publication DE 3 545 107 describes a method for preparation of rhamnose from arabic gum. A strongly acid cation exchange resin is used for the separation of the sugar and rhamnose is purified by adsorption with an activated charcoal. Arabinose is also separated with this method.

Barker, S. A. et al (Carbohydrate Research, 26 (1973) 55–64) have described the use of poly(4-vinylbenzeneboronic acid) resins in the fractionation and interconversion of carbohydrates. In the method water is used as an eluent. The best yield of fructose was received when the pH was high. The resins have been used to displace the pseudo equilibrium established in aqueous alkali between D-glucose, D-fructose and D-mannose to yield D-fructose.

Surprisingly it has been found out that when using weakly acid cation exchange resins an improved chromatographic separation of carbohydrates is accessed. In addition to other features the order of separation seems to be affected by the hydrophobic/hydrophilic interactions of carbohydrates with resin and an improved separation of carbohydrates is resulted. Other commonly known features in chromatographic separation of carbohydrates on ion exchange resins include e.g. ion exclusion and size exclusion. If the resin is in the hydrophilic form the most hydrophobic monosaccharides seem to elute first and the most hydrophilic last. This results in a different elution order than previously found.

SUMMARY OF THE INVENTION

The above mentioned objects and others are accomplished by the present invention in which a weakly acid cation exchange resin is used to separate monosaccharides, disaccharides or oligosaccharides chromatographically. Preferably the ion exchange resin used is a acrylic weakly acid cation exchanger with a carboxylic functional group cross-linked with from about 1 to about 20%, preferably from about 3 to about 8% divinyl benzene. The resin is in $H^+$, $K^+$, $Na^+$, $Mg^{2+}$ or $Ca^{2+}$ form and also other ion forms can be used. This kind of resin proved to be more efficient than the earlier tested, e.g. the polystyrene matrix resins. This seems to be also affected to the fact that aromatic based resins are more hydrophobic than the acrylic based resins.

The weakly acid cation exchange resin is used for the separation of carbohydrates, particularly hydrophobic saccharides. Preferably the weakly acid cation exchange resin is used for the separation of hydrophobic monosaccharides, such as deoxy, methyl and anhydrosugars and sugar alcohols from more hydrophilic saccharides. Most preferably the weakly acid cation exchange resin is used for separating saccharides consisting of the group of hexoses, such as ketohexoses, aldohexoses, pentoses, such as ketopentoses, aldopentoses, corresponding sugars and sugar alcohols and mixtures thereof, e.g. glucose, fructose, rhamnose, anhydrosorbitol, sorbitol, erythritol, inositol, arabinose, xylose and xylitol. Sucrose, betaine and amino acid containing solutions can also be separated advantageously. The weakly acid cation exchange resin is also used for separating anhydrosugars from corresponding sugars, separating anhydrosugar alcohols from corresponding sugar alcohols, separating sugars, sugar alcohols and their anhydro forms from salts and for separating erythritol from inositol. When the resin is in a hydrophilic form the most hydrophobic monosaccharide seems to be eluted first and the most hydrophilic monosaccharide seems to be eluted last. This seems to be affected by the hydrophilic/hydrophobic interactions of the resin and the components.

The raw materials containing aforementioned carbohydrates, hydrolysates and extracts from plants or raw materials converted thereof containing aforementioned carbohydrates for which the weakly acid cation exchanger is to be used are e.g. xylose process streams, sucrose process streams, starch or sucrose based streams, for example maltose, glucose or fructose process streams or their process side streams.

The weakly acid cation exchange resin described above is used in a chromatographic column. The resin is used in a chromatographic column at temperatures from 10 to 95° C. preferably from 40 to 95° C., more preferably from 60 to 95° C. It is known that a higher separation temperature decreases viscosity and improves the separation performance of the sugars.

The eluent used in the chromatographic separation is water for instance demineralized water or condensate water or some other aqueous solution, alcohol or a mixture thereof. Preferably the eluent is water.

The order of elution of the monosaccharides in the present invention is different from the elution order obtained earlier by using strong base resins in bisulfite or sulfate form or using strong acid cation exchange resins. As one preferred example of the invention rhamnose can be separated before more hydrophilic monosaccharides. This allows the rhamnose to be recovered with good yield as a highly purified fraction. When separating betaine, erythritol and inositol the carbohydrates are separated in said order after betaine. If rhamnose is separated from other monosaccharides it is advantageous that rhamnose is eluted first. If erythritol and inositol are separated from a betaine containing solution it is advantageous that erythritol is separated before inositol.

BRIEF DESCRIPTION OF THE DRAWINGS

The following drawings are illustrative of embodiments of the invention and are not meant to limit the scope of the invention.

DETAILED DESCRIPTION

Figure 1:
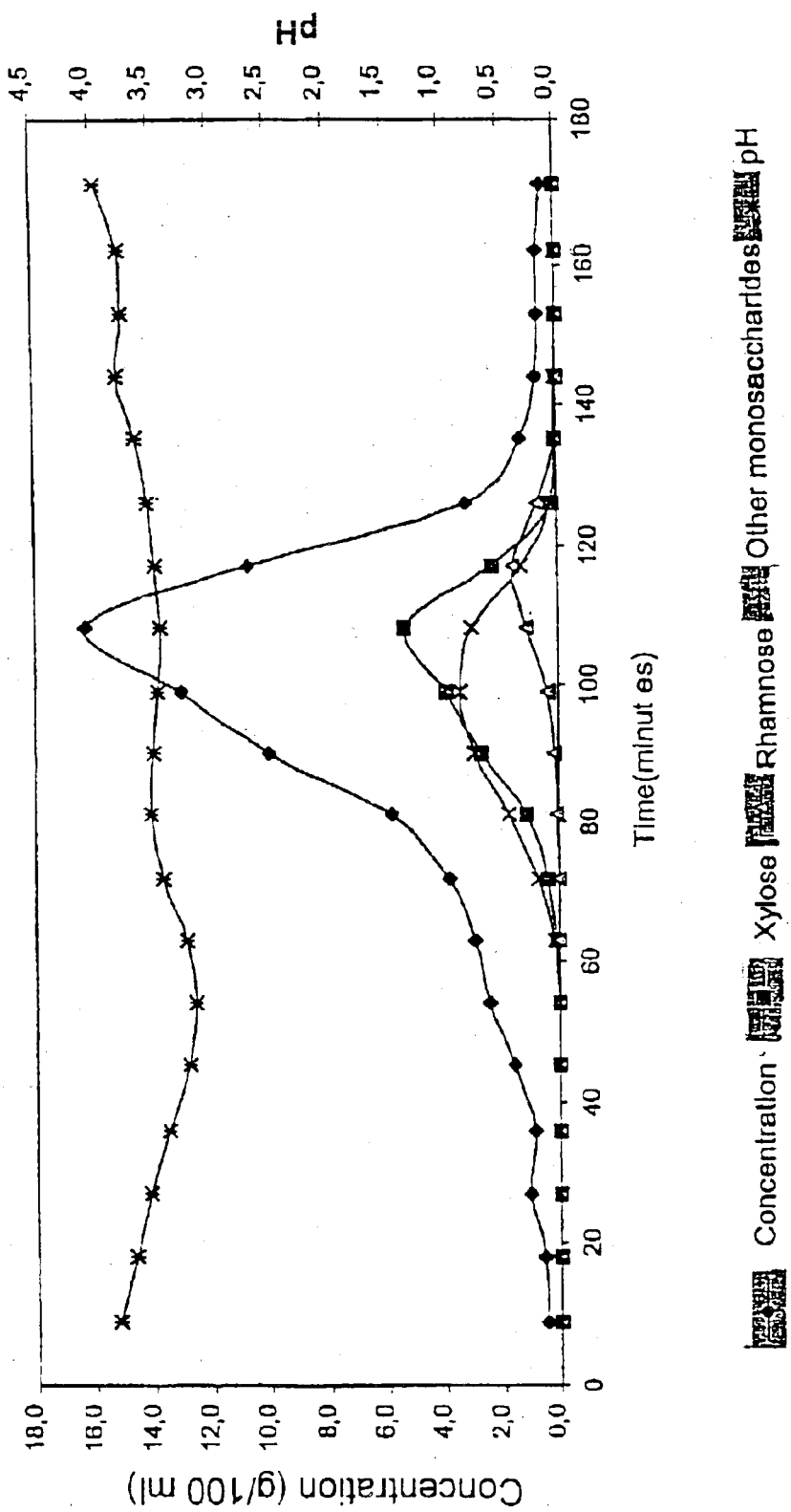
FIG. 1 is a graphical presentation of the elution profiles and pH obtained from Example 1.

A solution containing carbohydrates is subjected to a chromatographic separation. The separation is performed in a chromatographic separation column. The chromatographic column is filled with a weakly acid cation exchange resin.

The resin used in the chromatographic column is suitably a weakly acid acrylic cation exchanger having carboxylic functional groups. The weakly acid acrylic cation exchange resin is derived from the group consisting of acrylate esters, like methyl acrylate, ethyl acrylate, butyl acrylate and methyl methacrylate or acrylonitrile or acrylic acids of mixtures thereof. The skeleton of the resin can also be other than acrylic. The active functional group can also be other than carboxylic group, e.g. it can be selected from other weak acids. The acrylic cation exchange resin is cross-linked with a compound from the group consisting of aromatic cross-linker, like divinyl benzene or with a aliphatic cross-linker like isoprene, 1,7-octadiene, trivinylcyclohexane, diethylene glycol divinylether. The degree of the cross-linkage of the resin is from about 1 to about 20%, preferably about 3 to about 8% divinyl benzene. The average particle size of the weakly acid cation exchange resin is from 10 to 2000 micrometers, preferably from 100 to 400 micrometers. The resin can be regenerated into mainly $H^+$, $K^+$, $Na^+$, $Mg^{2+}$ or $Ca^{2+}$ form. Other ion forms may also be used.

The carbohydrate solution to be fractioned is optionally pretreated first by filtration, which can be done using a pressure filter and diatomaceous earth as filter aid. The feed solution is optionally adjusted to pH from 1 to 11, preferably from 2 to 10, more preferably from 2 to 4 and from 5 to 10 e.g. with sodium hydroxide solution. After this the solution may be optionally filtered before chromatographic separation.

Also the dry substance content of the feed solution is adjusted to an appropriate level before chromatographic separation.

A feeding device may be used for feeding the solution on the surface of the resin bed. The flow of the solution can be downwards or upwards, downwards is preferred. The temperature of the column and feed solution and eluent is 10 to 95° C., preferably 40 to 95° C. and most preferably approximately from 60 to 95° C. This is accomplished by preheating the solution. The eluent used is either water or solvent. Water can be for instance demineralized water or condensate water. Solvent can be an aqueous solution or alcohol or a mixture thereof. Preferably the eluent is water for efficient separation.

The feed solution is eluted in the column by feeding preheated water, for instance demineralized water or condensate water or some other aqueous solution or alcohol or a mixture thereof into the column. The flow rate in the column is adjusted to an appropriate level.

The fractions of the outcoming solution are collected at appropriate intervals and optionally the composition of the fractions is analysed. The outcoming streams can be followed by online instruments.

The following examples illustrate the present invention. They are not to be construed to limit the claims in any manner whatsoever.

EXAMPLE 1

Chromatographic Separation of Xylose Crystallization Run-Off with a $H^+/Mg^{2+}$-Form Resin Xylose crystallization run-off, which was beech wood based originally from Mg based si-cooking liquor was subjected to a chromatographic separation. The separation was performed in a laboratory chromatographic separation column as a batch process. The column with a diameter of 0.045 m was filled with an acrylic weakly acid cation exchange resin (Finex™ CA 12 GC) manufactured by Finex Oy, Finland. The resin was an ethyl acrylate-based resin. The height of the resin bed was about 0.70 m. The cross-linkage degree of the resin was 6.0% DVB and the average particle size of the resin was 0.26 mm. The resin was regenerated into mainly $H^+$-form (94%) and partly $Mg^{2+}$-form (6%) and a feeding device was placed at the top of the resin bed. The temperature of the column and feed solution and eluent water was approximately 65° C. The flow rate in the column was adjusted to 4 ml/min.

The chromatographic separation was carried out as follows:

Step 1:
The dry substance of the feed solution was adjusted to 25 g dry substance in 100 g solution according to the refractive index (RI) of the solution. The pH of the feed solution was 3.5.

Step 2:
100 ml of preheated feed solution was pumped to the top of the resin bed.

Step 3:
The feed solution was eluted downwards in the column by feeding preheated ion-exchanged water to the top of the column.

Step 4:
10 ml samples of the outcoming solution were collected at 3 min intervals. The composition of the samples was analysed with Dionex HPLC equipment with pulsed electrochemical detector and CarboPac PA1™ anion exchange column (water and 0.2 M NaOH as eluents).

Resin gives a good separation of rhamnose from other monosaccharides. Arabinose and rhamnose are eluted in the end of the separation profile. The pH of the effluent was between 3 to 4. The results are shown graphically in FIG. 1.

EXAMPLE 2

Chromatographic Separation of Anhydrosorbitol (1, 4-anhydro-D-glucitol) and Sorbitol with a $Na^+$-Form Resin A solution containing anhydrosorbitol (1,4-anhydro-D-glucitol) and sorbitol was subjected to a chromatographic separation. The solution was prepared by dissolving pure anhydrosorbitol and sorbitol into ion-exchanged water. The separation was performed in a laboratory chromatographic separation column as a batch process. The column with a diameter of 0.045 m was filled with an acrylic weakly acid cation exchange resin (Finex™ CA 12 GC) manufactured by Finex Oy, Finland. The resin was an ethyl acrylate-based resin. The height of the resin was about 0.70 m. The cross-linkage degree of the resin was 6% DVB and the average particle size of the resin was 0.26 mm. The resin was in $Na^+$-form. The pH of the resin was high after the manufacturing process. A feeding device was placed at the top of the resin bed. The temperature of the column and feed solution and eluent water was approximately 65° C. The flow rate in the column was adjusted to 4 ml/min.

The chromatographic separation was carried out as follows:

Step 1:
The dry substance of the feed solution was adjusted to 25 g dry substance in 100 g solution according to the refractive index (RI) of the solution. The feed solution composed of 50% on dry substance (DS) anhydrosorbitol and 50% on DS sorbitol.

Step 2:
100 ml of preheated feed solution was pumped to the top of the resin bed.

Step 3:
The feed solution was eluted downwards in the column by feeding preheated ion-exchanged water to the top of the column.

Step 4:
10 ml samples of the outcoming solution were collected at 3 min intervals. The composition of the samples was analysed with HPLC ($Pb^{2+}$-form resin, 0.6 ml/min, 85° C. water eluent).

Figure 2:
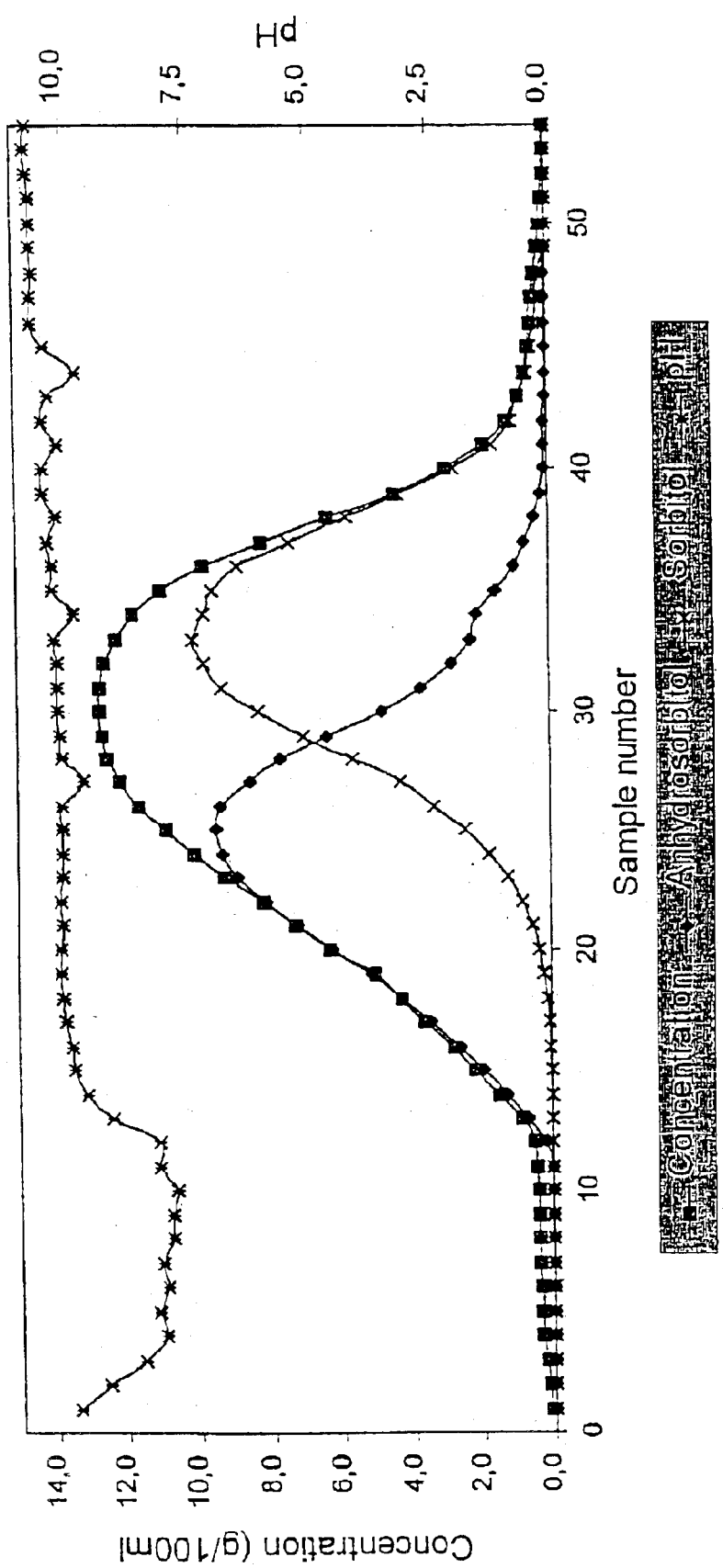
FIG. 2 is a graphical presentation of the elution profiles and pH obtained from Example 2.

Components were eluted from the column in the following order: anhydrosorbitol and sorbitol. The elution order seems to be consistent with the hydrophobic/hydrophilic-nature of the components. The pH of the effluent was between 7.5 to 11. The resin separated components from each other well. The results are shown graphically in FIG. 2.

EXAMPLE 3

Chromatographic Separation of Sucrose, Glucose and Fructose with a $Na^+$-Form Resin A solution containing sucrose, glucose and fructose was subjected to a chromatographic separation. The solution was prepared by dissolving pure sucrose, glucose and fructose into ion-exchanged water. The separation was performed in a laboratory chromatographic separation column as a batch process. The column with a diameter of 0.045 m was filled with an acrylic weakly acid cation exchange resin (Finex™ CA 12 GC) manufactured by Finex Oy, Finland. The resin was an ethyl acrylate-based resin. The height of the resin was about 0.70 m. The cross-linkage degree of the resin was 6% DVB and the average particle size of the resin was 0.26 mm. The resin was in $Na^+$-form. The pH of the resin was high after the manufacturing process. A feeding device was placed at the top of the resin bed. The temperature of the column and feed solution and eluent water was approximately 65° C. The flow rate in the column was adjusted to 4 ml/min.

The chromatographic separation was carried out as follows:

Step 1:
The dry substance of the feed solution was adjusted to 25 g dry substance in 100 g solution according to the refractive index (RI) of the solution. The feed solution composed of 33% on dry substance (DS) sucrose, 33% on DS glucose and 33% on DS fructose.

Step 2:
100 ml of preheated feed solution was pumped to the top of the resin bed.

Step 3:
The feed solution was eluted downwards in the column by feeding preheated ion-exchanged water to the top of the column.

Step 4:
10 ml samples of the outcoming solution were collected at 3 min intervals. The composition of the samples was analysed with HPLC ($Na^+$-form resin, 0.8 ml/min, 0.003 M $Na_2SO_4$, 85° C.).

Figure 3:
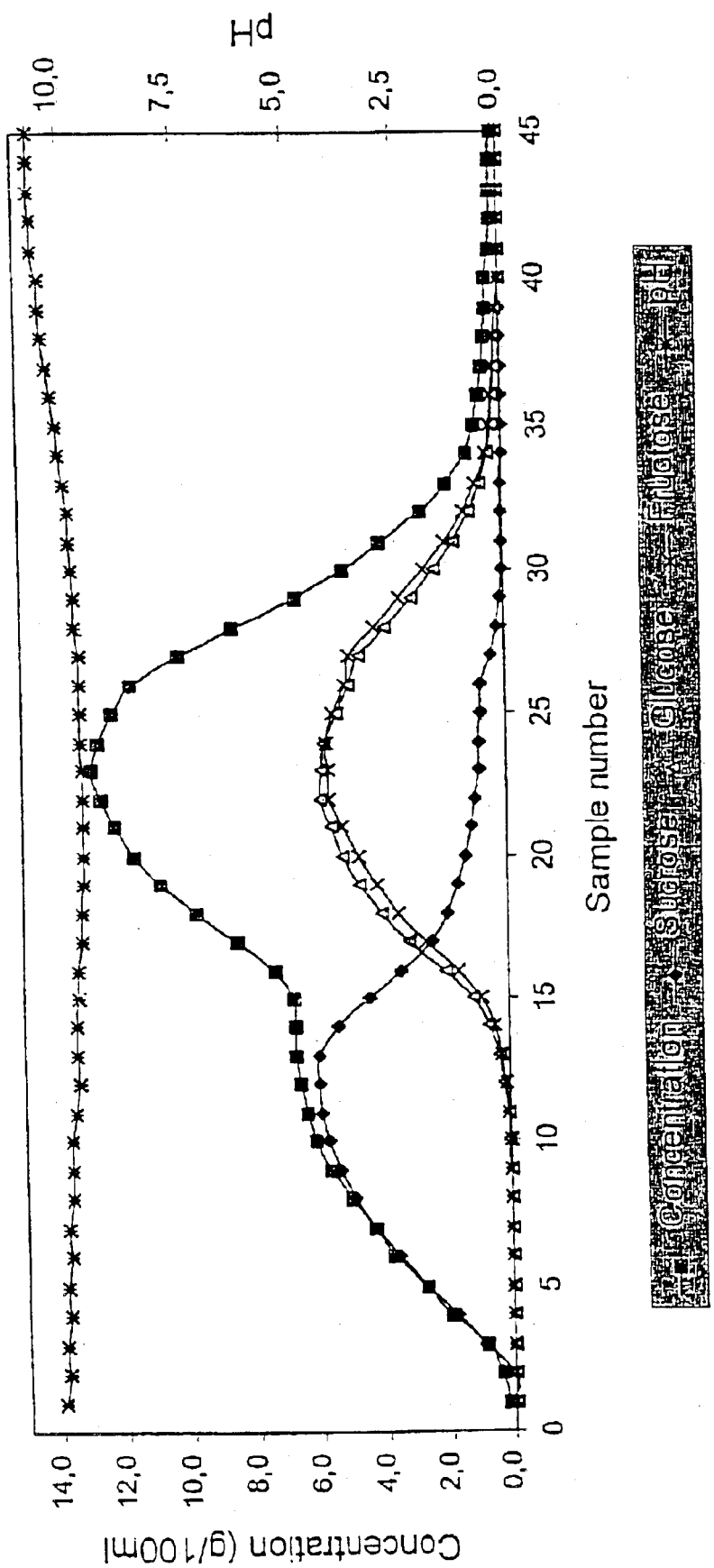
FIG. 3 is a graphical presentation of the elution profiles and pH obtained from Example 3.

First sucrose eluted from the column as a separate peak. Glucose and fructose eluted together as a second peak after sucrose. Resin gives a good separation between sucrose and monosaccharides. The pH of the effluent was between 9 to 11. The results are shown graphically in FIG. 3.

EXAMPLE 4

Chromatographic Separation of Sodium Chloride, Betaine, Erythritol and Inositol with a $Na^+$-Form Resin A solution containing betaine, erythritol, inositol and sodium chloride (NaCl) was subjected to a chromatographic separation. The solution was prepared by dissolving pure betaine, erythritol, inositol and sodium chloride into ion-exchanged water. The separation was performed in a laboratory chromatographic separation column as a batch process. The column with a diameter of 0.045 m was filled with an acrylic weakly acid cation exchange resin (Finex™ CA 12 GC) manufactured by Finex Oy, Finland. The resin was an ethyl acrylate-based resin. The height of the resin bed was about 0.70 m. The cross-linkage degree of the resin was 6% DVB and the average particle size of the resin was 0.26 mm. The resin was in $Na^+$-form. The pH of the resin was high after the manufacturing process. A feeding device was placed at the top of the resin bed. The temperature of the column and feed solution and eluent water was approximately 80° C. The flow rate in the column was adjusted to 4 ml/min.

The chromatographic separation was carried out as follows:

Step 1:
The dry substance of the feed solution was adjusted to 25 g dry substance in 100 g solution according to the refractive index (RI) of the solution. The feed solution composed of 30% on dry substance (DS) betaine, 30% on DS inositol, 30% on DS erythritol and 10% on DS sodium chloride.

Step 2:
100 ml of preheated feed solution was pumped to the top of the resin bed.

Step 3:
The feed solution was eluted downwards in the column by feeding preheated ion-exchanged water to the top of the column.

Step 4:
10 ml samples of the outcoming solution were collected at 3 min intervals. The composition of the samples was analysed with HPLC ($Ca^{2+}$-form resin, 0.8 ml/min, 0.001 M $Ca(NO_3)_2$, 85° C.).

Figure 4:
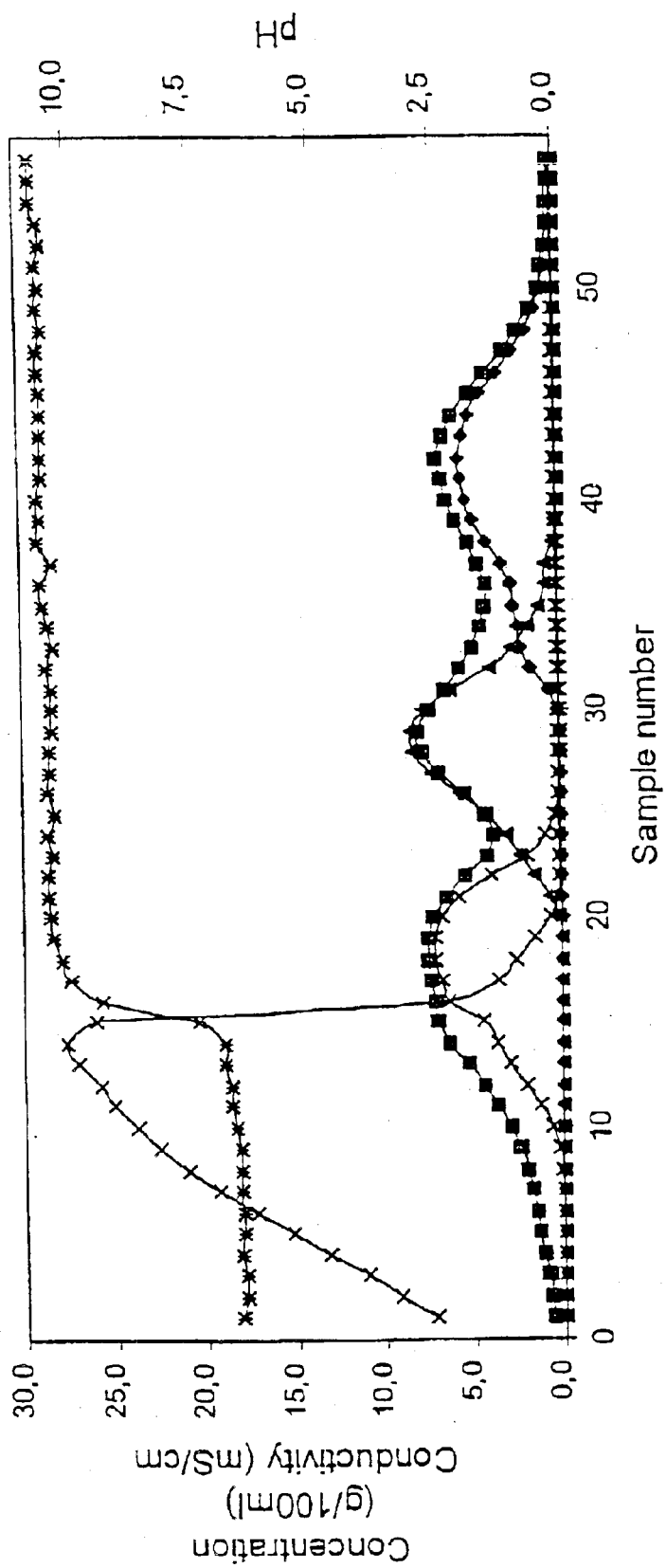
FIG. 4 is a graphical presentation of the elution profiles and pH obtained from Example 4.

Components were eluted from the column in the following order: sodium chloride, betaine, erythritol and inositol. The elution order of betaine and carbohydrates seems to be consistent with the hydrophobic/hydrophilic-nature of the components. The resin separated components from each other well. The pH of the effluent was between 6 to 9. The results are shown graphically in FIG. 4.

EXAMPLE 5

Chromatographic Separation of Sodium Chloride, Betaine, Sucrose and Mannitol with a $Na^+$-Form Resin A solution containing betaine, sucrose, mannitol and sodium chloride (NaCl) was subjected to a chromatographic separation. The solution was prepared by dissolving pure betaine, sucrose, mannitol and sodium chloride into ion-exchanged water. The separation was performed in a laboratory chromatographic separation column as a batch process. The column with a diameter of 0.045 m was filled with an acrylic weakly acid cation exchange resin (Finex CA 12 GC) manufactured by Finex Oy, Finland. The resin was an ethyl acrylate-based resin. The height of the resin was about 0.65 m. The cross-linkage degree of the resin was 6% DVB and the average particle size of the resin was 0.26 mm. The resin was in $Na^+$-form. The pH of the resin was high after the manufacturing process. A feeding device was placed at the top of the resin bed. The temperature of the column and feed solution and eluent water was approximately 80° C. The flow rate in the column was adjusted to 4 ml/min.

The chromatographic separation was carried out as follows:

Step 1:

The dry substance of the feed solution was adjusted to 25 g dry substance in 100 g solution according to the refractive index (RI) of the solution. The feed solution composed of 30% on dry substance (DS) betaine, 30% on DS sucrose, 30% on DS mannitol and 10% on DS sodium chloride.

Step 2:

100 ml of preheated feed solution was pumped to the top of the resin bed.

Step 3:

The feed solution was eluted downwards in the column by feeding preheated ion-exchanged water to the top of the column.

Step 4:

10 ml samples of the outcoming solution were collected at 3 min intervals. The composition of the samples was analysed with HPLC ($Na^+$-form resin, 0.8 ml/min, 0.003 M $Na_2SO_4$, 85° C.).

Figure 5:
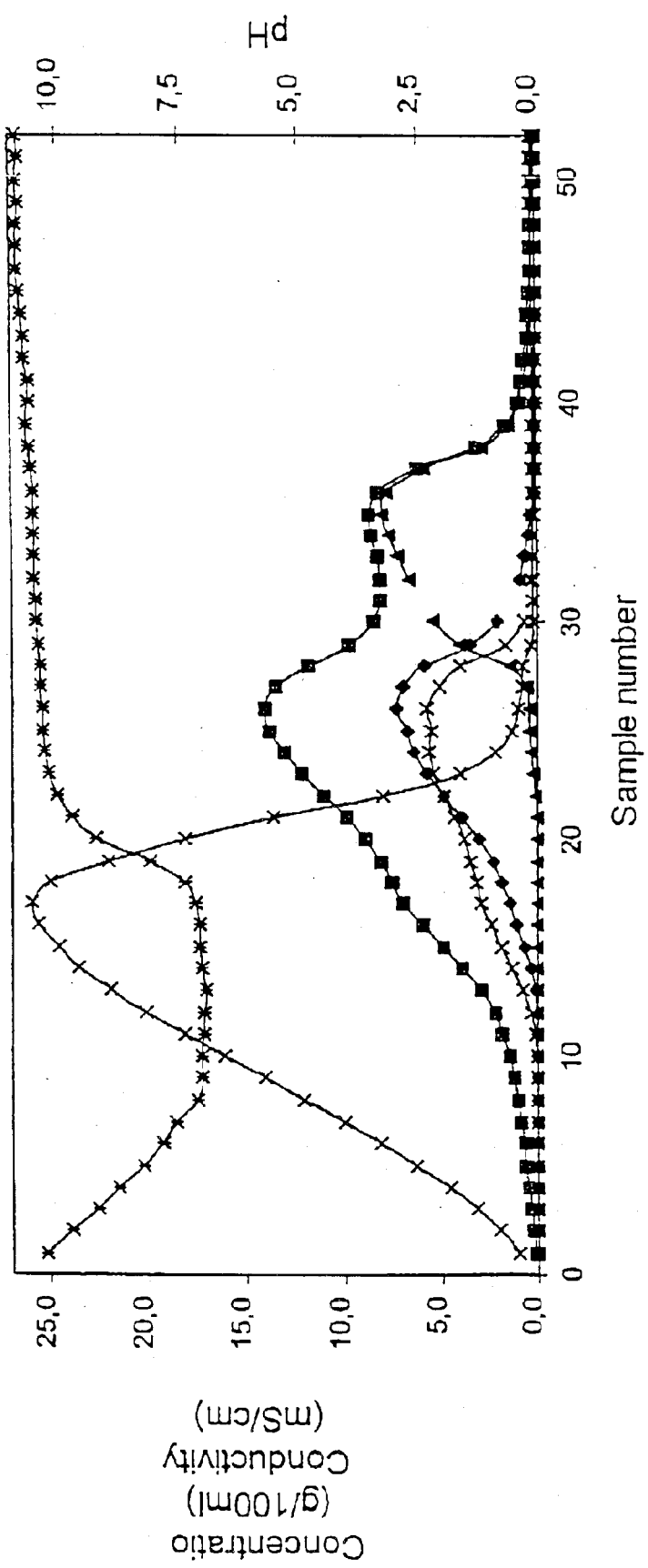
FIG. 5 is a graphical presentation of the elution profiles and pH obtained from Example 5.

First sodium chloride was eluted from the column. Sucrose and betaine were eluted from the column together as a one peak overlapping with salts to some extent. Mannitol was eluted from the column as a separate peak after sucrose and betaine. Resin separated mannitol from sucrose and betaine well. The pH of the effluent was between 7 to 11. The results are shown graphically in FIG. 5.

EXAMPLE 6

Chromatographic Separation of Beet Molasses with Weakly Acid Cation Exchange Resin Beet molasses was subjected to a chromatographic separation. The separation was performed in a laboratory scale chromatographic separation column as a batch process. The column with a diameter of 0.045 m was filled with an acrylic weakly acid cation exchange resin (Finex™ CA 16 GC, manufactured by Finex Oy, Finland). The resin was methyl acrylate based. The cross-linkage degree of the resin was 8% DVB and the average particle size about 0.23 mm. The resin was in $Na^+$-form prior the separation.

The height of the resin was about 0.70 m. The pH of the resin was quite high after the manufacturing process (pH about 9–10). A feeding device was placed at the top of the resin bed. The temperature of the column, feed solution and eluent water was approximately 80° C. The flow rate in the column was adjusted to 4 ml/min. The feed solution was filtered via filter prior the separation. The pH of the feed solution was about 8.2.

The chromatographic separation was carried out as follows:

Step 1:

The dry substance of the feed solution was adjusted to 25 g dry substance in 100 g solution according to the refractive index (RI) of the solution.

Step 2:

100 ml of preheated feed solution was pumped to the top of the resin bed.

Step 3:

The feed solution was eluted downwards in the column by feeding preheated ion-exchanged water to the top of the column.

Step 4:

10 ml samples of the outcoming solution were collected in 3 min interval. The composition of the samples was analysed with HPLC ($Na^+$-form column, 0.8 ml/min, 0.003 M $Na_2SO_4$, 85° C.).

Figure 6:
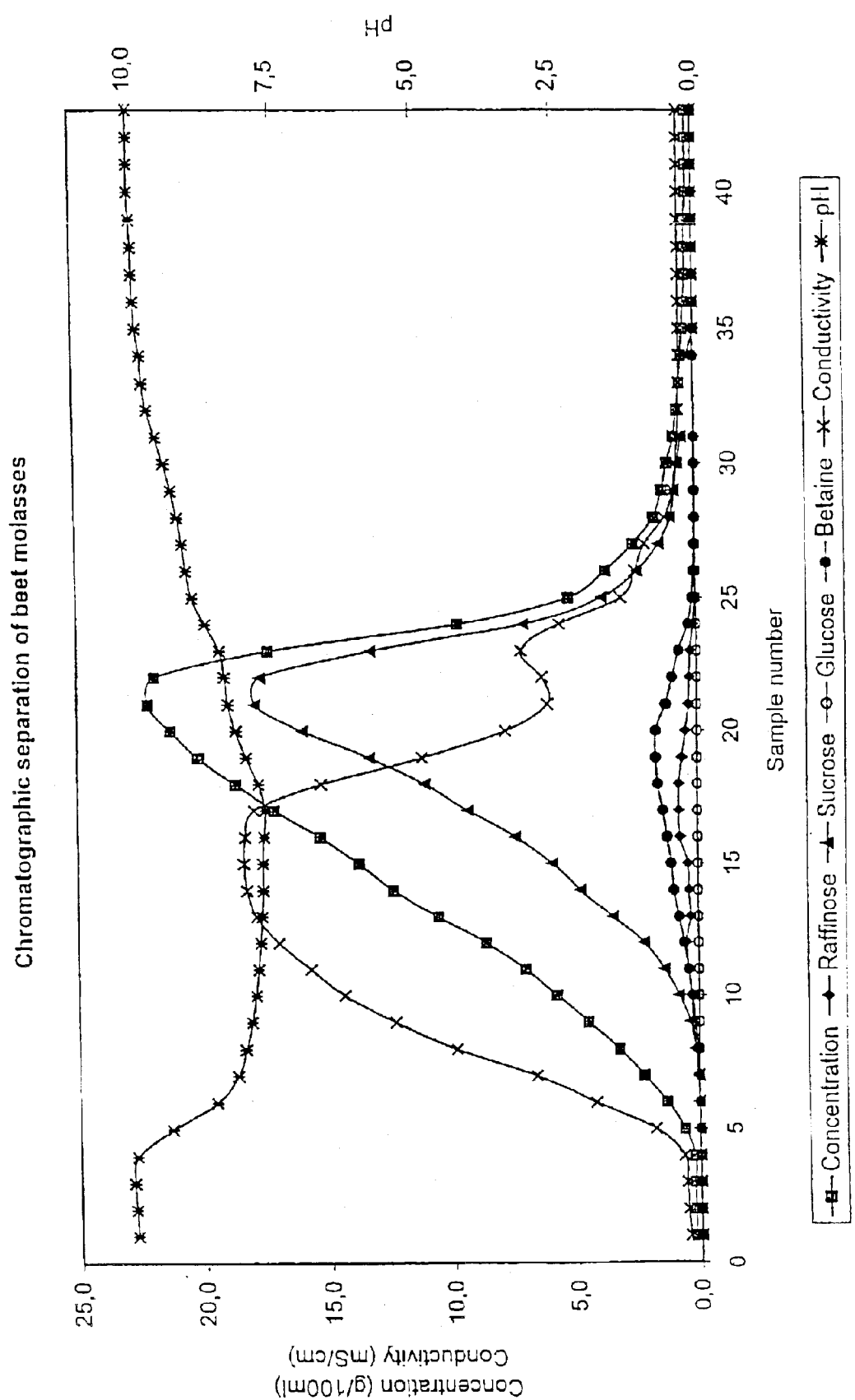
FIG. 6 is a graphical presentation of the elution profiles and pH obtained from Example 6.

Salts eluted out of the column first. Sucrose and betaine are eluted at the same retention time and overlapped with the salts to some extent. Amino acids eluted mainly at the back slope of the profile. The pH of the effluent was between 7.5 to 10. The results are shown graphically in FIG. 6. Table 1 shows the amino acid concentration of samples 21 to 39.

TABLE 1

| | Amino acid concentration | | |
|---|---|---|---|
| Sample number | RDS g/100 g | Amino acids % on DS | Amino acids g/100 g |
| 21 | 20.54 | 1.8 | 0.370 |
| 23 | 16.36 | 3.1 | 0.507 |
| 25 | 5.09 | 8.5 | 0.433 |
| 26 | 3.58 | 13.0 | 0.465 |
| 27 | 2.47 | 16.5 | 0.408 |
| 29 | 1.28 | 4.9 | 0.063 |

EXAMPLE 7

Chromatographic Separation of Fructose Crystallization Run-Off with a $Na^+$-Form Resin Concentrated and heat treated fructose crystallization run-off was subjected to a chromatographic separation. The separation was performed in a laboratory chromatographic separation column as a batch process. The column with a diameter of 0.045 m was filled with an acrylic weakly acid cation exchange resin (Finex™ CA 12 GC) manufactured by Finex Oy, Finland. The resin was an ethyl acrylate-based resin. The height of the resin bed was about 0.70 m. The cross-linkage degree of the resin was 6% DVB and the average particle size of the resin was 0.26 mm. The resin was regenerated into Na⁺-form and a feeding device was placed at the top of the resin bed. The temperature of the column and feed solution and eluent water was 60° C. The flow rate in the column was adjusted to 4 ml/min. The pH of the feed solution was adjusted to 7 with sodium hydroxide.

The chromatographic separation was carried out as follows:

Step 1:
The dry substance of the feed solution was adjusted to 25 g dry substance in 100 g solution according to the refractive index (RI) of the solution.

Step 2:
100 ml of preheated feed solution was pumped to the top of the resin bed.

Step 3:
The feed solution was eluted downwards in the column by feeding preheated ion-exchanged water to the top of the column.

Step 4:
10 ml samples of the outcoming solution were collected at 3 min intervals. The composition of the samples was analysed with HPLC (Na⁺-form resin, 85° C., water eluent, 0.8 ml/min).

Figure 7:
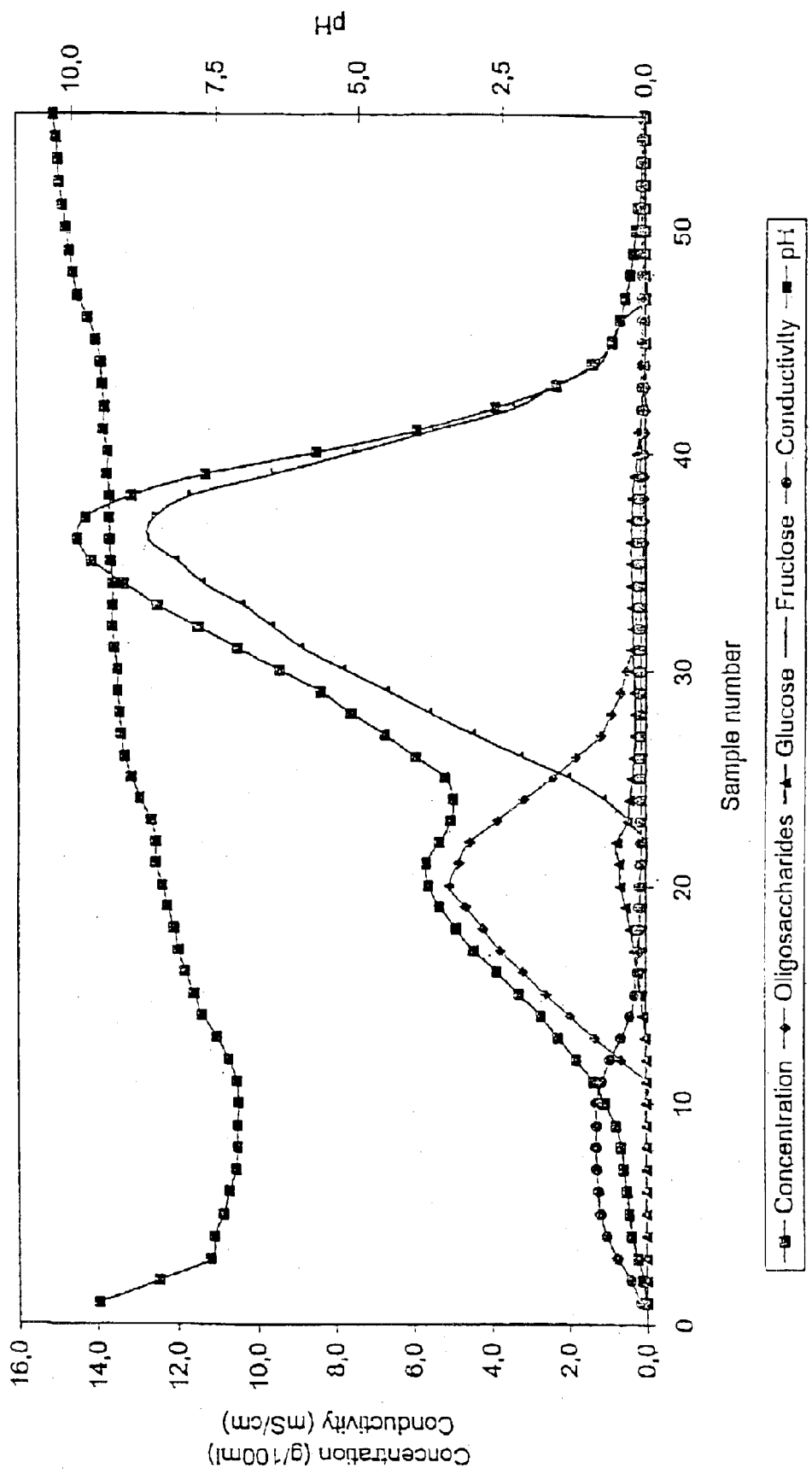
FIG. 7 is a graphical presentation of the elution profiles and pH obtained from Example 7.

Resin separates well fructose and oligosaccharides formed in thermal acid breakdown of fructose. Oligosaccharides are eluted from the column faster than fructose. The pH of the effluent was between 6 to 11. The results are shown graphically in FIG. 7.

EXAMPLE 8

The Use of Acryl-Based Resins in Liquid Chromatography While Using Deionized Water and an Approximately 30 Percent by Weight Water-Ethanol Solution as Eluents In a liquid chromatography test, acryl-based resins manufactured by Finex Oy (Finland) cross-linked with DVB (divinyl benzene) were used as the stationary phases. The cross-linking degrees of the resins were 4% DVB (CA08GC) and 6% DVB (CA12GC). The average particle size of the resins was 375 μm. A strong acid styrene-based sulphonated cation exchange resin (CS08G) of the same manufacturer, having an average particle size of 395 μm, was used as a comparison resin.

Pharmacia Biotech FPL™ liquid chromatography equipment was used in the column tests, the equipment comprising a pump, a jacketed glass column, with temperature control, an RI (Refractive Index) detector and a computer used in collecting the measurement data. An RI-98 SCOPE refractive index detector was used in on-line analysis of the effluent. The test column was a Pharmacia Biotech XK16 with a diameter of 1.6 cm. Resins in Na⁺ form were used in the tests, and approximately 60 ml of resin (water-swollen resin) was packed in the column. Bed height in water was approximately 30 cm.

In the column tests, deionized water and an approximately 30 percent by weight water-ethanol solution, with air removed from them by vacuum suction, were used as eluents. The flow rate of the eluent was 1 ml/min in all tests and the tests were carried out at a temperature of 25° C. The column was equalised before the measurements by pumping said eluent through it until the resin was equalised and the bottom level of the RI detector remained constant.

The samples used in the measurements were made with the eluent used in the operation. The xylose ($C_5H_{10}O_5$) and rhamnose monohydrate ($C_6H_{12}O_5 * 1H_2O$) content of the sample solutions was 70 g/l and Blue Dextran 1.5 g/l was used as the unretarded component. The sample volume was 0.5 ml. The porosity of the resin bed was determined from the pulse response values of the Blue Dextran runs.

The chromatographic parameters were calculated by the moment method. Before calculating the parameters, all chromatograms were processed with the Jandel Scientific Peak Fit v4 program, by means of which the bottom level of the curves was corrected and the negative peak caused by ethanol was removed. The division constants and the separation factor of xylose and rhamnose were calculated from the pulse responses as follows:

$$K_i = \frac{V_i - V_{BD}}{V_S} = \frac{\left(\frac{V_i}{v_n} - \frac{z\varepsilon}{v_n} - \frac{V_l}{2v_n}\right)}{\frac{z(1-\varepsilon)}{\frac{v_n}{(\pi r^2)}}} \quad (1)$$

wherein
$K_i$=the distribution constant of sub-type i
$V_i$=the retention volume of sub-type i
$V_{BD}$=the retention volume of the unretarded sub-type (Blue Dextran)
$V_S$=volume of stationary phase
$v_n$=flow rate of eluent
z=height of stationary phase
$\varepsilon$=porosity
r=radius of column
$V_l$=volume of supplied sample $$\alpha_{\frac{i}{j}} = \frac{V_i - V_{BD}}{V_j - V_{BD}}$$

wherein
$\alpha_{i/j}$=separation factor of sub-type i with respect to sub-type j
$V_j$=retention volume of sub-type j

TABLE 2

| Resin | Eluent | z cm | ε | $K_{rham}$ | $K_{xyl}$ | $\alpha_{rham/xyl}$ |
|---|---|---|---|---|---|---|
| CA08GC | Water | 29.2 | 0.34 | 0.39 | 0.56 | 1.44 |
|  | EtOH 29.3 w-% | 18.4 | 0.35 | 0.60 | 1.14 | 1.89 |
| CA12GC | Water | 30.0 | 0.34 | 0.25 | 0.42 | 1.66 |
|  | EtOH 29.4 wt-% | 23.3 | 0.34 | 0.53 | 1.03 | 1.95 |
| CS08G | Water | 29.9 | 0.37 | 0.47 | 0.53 | 1.13 |
|  | EtOH 29.3 w-% | 26.5 | 0.36 | 0.70 | 0.85 | 1.21 |

The results show that adding ethanol to the eluent improves the separation of xylose and rhamnose. The results show that weakly acid cation exchange resin is better for chromatographic separation of xylose and rhamnose than a strong acid cation exchange resin.

We claim:

1. A process for chromatographically separating hydrophilic carbohydrates from hydrophobic carbohydrates comprising introducing a carbohydrate-containing feed solution into a chromatographic column filled with a weak acid cation exchange resin.

2. The process according to claim 1 wherein said weak acid cation exchange resin is an acrylic resin.

3. The process according to claim 2 wherein said acrylic resin is derived from the group consisting of acrylic ester, acrylonitrile, acrylic acids and mixtures thereof.

4. The process according to claim 3 wherein said acrylate ester is selected from the group consisting of methyl methacrylate, methyl acrylate, ethyl acrylate and butyl acrylate.

5. The process according to claim 1 wherein the cation of said weak acid cation exchange resin is in the form of $H^+$, $Na^+$, $K^+$, $Ca^{2+}$ or $Mg^{2+}$.

6. The process according to claim 1 wherein said weak acid cation exchange resin is cross-linked with an aromatic or aliphatic cross-linker.

7. The process according to claim 6 wherein said aromatic cross-linker is divinyl benzene.

8. The process according to claim 6 wherein said aliphatic cross-linker is selected from the group consisting of isoprene, 1,7-octadiene, trivinyl cyclohexane and diethylene glycol divinylether.

9. The process according to claim 1 wherein the average particle size of the resin is from 10 to 2000 rmcrometers.

10. The process according to claim 9 wherein the average particle size of the resin is from 100 to 400 micrometers.

11. The process according to claim 1 wherein in the chromatographic separation the pH of the feed solution is from 1 to 11.

12. The process according to claim 11 wherein the pH of the feed solution is from 2 to 10.

13. The process according to claim 12 wherein the pH of the feed solution is from 2 to 4.

14. The process according to claim 12 wherein the pH of the feed solution is from 5 to 10.

15. The process according to claim 1 wherein the temperature of the chromatographic column, the feed solution and an eluent is from 10 to 95° C.

16. The process according to claim 15 wherein the temperature of the chromatographic column, the feed solution and the eluent is from 40 to 95° C.

17. The process according to claim 16 wherein the temperature of the chromatographic column, the feed solution and the eluent is from 60 to 95° C.

18. The process according to claim 1 wherein an eluent used in the chroniatographic separation is selected from the group consisting of water, an alcohol and a mixture thereof.

19. The process according to claim 18 wherein the eluent is water.

20. The process according to claim 1 wherein the carbohydrates to be separated are sugars and sugar alcohols.

21. The process according to claim 1 wherein anhydrosugars are separated from the corresponding sugars.

22. The process according to claim 1 wherein anhydrosugar alcohols are separated from the corresponding sugar alcohols.

23. The process according to claim 1 wherein the carbohydrates to be separated are monosaccharides.

24. The process according to claim 23 wherein the monosaccharide is L-rhamnose.

25. The process according to claim 1 wherein the carbohydrates to be separated are selected from the group consisting of disaccharides and oligosaccharides.

26. The process according to claim 1 wherein carbohydrates to be separated are selected from the group consisting of hexoses, pentoses, corresponding sugars and sugar alcohols and mixtures thereof.

27. The process according to claim 26 wherein said hexoses are selected from the group consisting of ketohexoses and aldohexoses.

28. The process according to claim 26 wherein said pentoses are selected from the group consisting of ketopentoses and aldopentoses.

29. The process according to claim 26 wherein said corresponding sugars and sugar alcohols are selected from the group consisting of glucose, fructose, rhanmose, anhydrosorbitol, sorbitol, erythritol, inositol, arabinose, xylose and xylitol.

30. The process according to claim 1 wherein betaine and amino acids are separated from the carbohydrates.

31. The process according to claim 1 wherein sugars, sugar alcohols and their corresponding anhydroforms are separated from ionic substances.

32. The process according to claim 31 wherein the ionic substances are selected from salts.

33. The process according to claim 1 wherein in the carbohydrates containing feed solution is beet molasses.

34. The process according to claim 33 wherein sucrose and non-sugar components are recovered in beet molasses separation.

35. The process according to claim 33 wherein when molasses is subjected to separation sugar and non-sugar components are recovered.

36. The process according to claim 35 wherein amino acids are separated with sucrose fraction.

37. The process according to claim 36 wherein mannitol is separated from betaine, sucrose and salts.

38. The process according to claim 1 wherein fructose is separated from disaccharides and oligosaccharides.

39. The process according to claim 1 wherein monosaccharides are separated from the oligosaccharides.

40. The process according to claim 1 wherein the monosaccharides are separated from the disaccharides.

41. The process according to claim 1 wherein the sucrose is separated from fructose and glucose.

42. The process according to claim 1 wherein erythritol, inositol and mannitol are separated from betaine.

43. The process according to claim 42 wherein erythritol is separated from inositol.

* * * * *